United States Patent
Yasuda et al.

(10) Patent No.: US 11,662,328 B2
(45) Date of Patent: May 30, 2023

(54) CAPACITIVE SENSOR AND MANUFACTURING METHOD OF CAPACITIVE SENSOR

(71) Applicants: OHT inc., Hiroshima (JP); TOHOKU UNIVERSITY, Miyagi (JP)

(72) Inventors: Toshiro Yasuda, Fukuyama (JP); Kazutoshi Kamibayashi, Fukuyama (JP); Shigetoshi Sugawa, Sendai (JP); Rihito Kuroda, Sendai (JP); Tetsuya Goto, Sendai (JP)

(73) Assignees: OHT Inc., Hiroshima (JP); TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 17/358,292

(22) Filed: Jun. 25, 2021

(65) Prior Publication Data

US 2022/0011255 A1     Jan. 13, 2022

(30) Foreign Application Priority Data

Jul. 8, 2020 (JP) .............................. JP2020-117659

(51) Int. Cl.
    *G01N 27/24* (2006.01)
(52) U.S. Cl.
    CPC .................... *G01N 27/24* (2013.01)
(58) Field of Classification Search
    CPC ...................................................... G01N 27/24
    See application file for complete search history.

(56) References Cited

U.S. PATENT DOCUMENTS

| 7,199,345 | B1 * | 4/2007 | Meisel | H01J 29/98 |
| | | | | 250/214.1 |
| 2008/0265249 | A1 * | 10/2008 | Sato | H01L 22/32 |
| | | | | 257/E23.002 |
| 2010/0167430 | A1 * | 7/2010 | Steele | G01R 31/2829 |
| | | | | 257/E23.079 |

(Continued)

FOREIGN PATENT DOCUMENTS

| JP | 2001-168133 A | 6/2001 |
| TW | 201729062 A | 8/2017 |

(Continued)

OTHER PUBLICATIONS

Taiwanese Office Action dated Jun. 28, 2022 received in 110123689.

(Continued)

*Primary Examiner* — Feba Pothen
(74) *Attorney, Agent, or Firm* — Scully, Scott, Murphy & Presser, P.C.

(57) ABSTRACT

A capacitive sensor includes a sensing electrode, a first electrode pad, a substrate, and a second electrode pad. The sensing electrode outputs a signal corresponding to a capacitance between the sensing electrode and a detection target. The first electrode pad is coupled to the sensing electrode. The substrate includes a substrate surface portion and a step portion. On the substrate surface portion are the sensing electrode and the first electrode pad mounted. The step portion is provided at a position in the substrate lower than the substrate surface portion. The second electrode pad is mounted on the step portion and coupled to an external line.

3 Claims, 5 Drawing Sheets

(56) References Cited

U.S. PATENT DOCUMENTS

| | | | |
|---|---|---|---|
| 2015/0230339 A1* | 8/2015 | Arnold | H01L 29/0657 |
| | | | 345/173 |
| 2015/0293160 A1 | 10/2015 | Kasai et al. | |
| 2016/0211233 A1 | 7/2016 | Yiu et al. | |
| 2016/0216793 A1 | 7/2016 | Choi et al. | |
| 2017/0168611 A1* | 6/2017 | Jang | G06F 3/0444 |
| 2017/0276711 A1 | 9/2017 | Pak et al. | |
| 2018/0121705 A1 | 5/2018 | Oganesian | |

FOREIGN PATENT DOCUMENTS

| | | |
|---|---|---|
| TW | I611528 B | 1/2018 |
| TW | I660519 B | 5/2019 |
| WO | 2015/046756 A1 | 4/2015 |

OTHER PUBLICATIONS

Taiwanese Office Action dated Jan. 30, 2023 received in 110123689.

* cited by examiner

CAPACITIVE SENSOR AND MANUFACTURING METHOD OF CAPACITIVE SENSOR

CROSS-REFERENCE TO RELATED APPLICATIONS

This application is based upon and claims the benefit of priority from the Japanese Patent Application No. 2020-117659, filed Jul. 8, 2020, the entire contents of which are incorporated herein by reference.

FIELD

The present embodiment relates to a capacitive sensor and a manufacturing method of the capacitive sensor.

BACKGROUND

The capacitive sensor disclosed in Jpn. Pat. Appln. KOKAI Publication No. 2001-168133 is configured to detect various states of a detection target from a signal corresponding to a capacitance between the detection target and a sensing electrode when bringing the sensing electrode in close proximity to the detection target. The capacitive sensor of this type is employed, for example for determination of defectiveness or otherwise of a conductive pattern formed on a circuit board.

In principle, the sensitivity of a capacitive sensor increases as the distance to a detection target is shortened. In this aspect, it is preferable to design a capacitive sensor that can both reduce a distance to the detection target and be protected from breakage even if the sensor is accidentally brought into contact with the detection target.

SUMMARY

The purpose of the present embodiment is to offer a capacitive sensor that can be placed as close as possible to a detection target and is less prone to breakage, and a manufacturing method of such a sensor.

A capacitive sensor according to the first aspect includes a sensing electrode, a first electrode pad, a substrate, and a second electrode pad. The sensing electrode outputs a signal corresponding to a capacitance between the sensing electrode and a detection target. The first electrode pad is coupled to the sensing electrode. The substrate includes a substrate surface portion and a step portion. On the substrate surface portion are the sensing electrode and the first electrode pad mounted. The step portion is provided at a position in the substrate lower than the substrate surface portion. The second electrode pad is mounted on the step portion and coupled to an external line.

A manufacturing method of a capacitive sensor according to the second aspect includes forming a step portion by etching an end portion of a substrate that includes a sensing electrode and a substrate surface portion, the sensing electrode being configured to output a signal corresponding to a capacitance between the sensing electrode and a detection target, a first electrode pad being coupled to the sensing electrode and mounted on the substrate surface portion; forming a line extending from the first electrode pad to the step portion; and forming a second electrode pad on the step portion to be coupled to the line and an external line.

DETAILED DESCRIPTION

Figure 1:
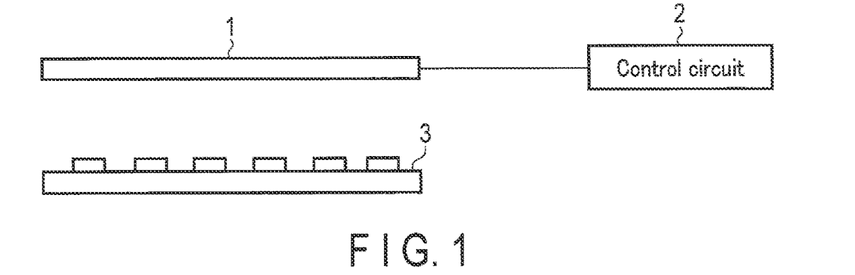
FIG. 1 is a diagram showing a capacitive sensor according to an embodiment.

The embodiments will be explained with reference to the drawings. FIG. 1 is a diagram showing a capacitive sensor according to an embodiment. A capacitive sensor 1 is a sensor configured to output a signal corresponding to a capacitance between the capacitive sensor 1 and a detection target 3 when being brought in close proximity to the detection target 3. The capacitive sensor 1 is coupled to a control circuit 2. The control circuit 2 inputs a signal for driving the capacitive sensor 1, and receives a signal from the capacitive sensor 1 to perform necessary processing thereon. For instance, if the detection target 3 is a circuit board, the control circuit 2 detects a defective portion in the circuit board from a capacitance signal.

Figure 2A:
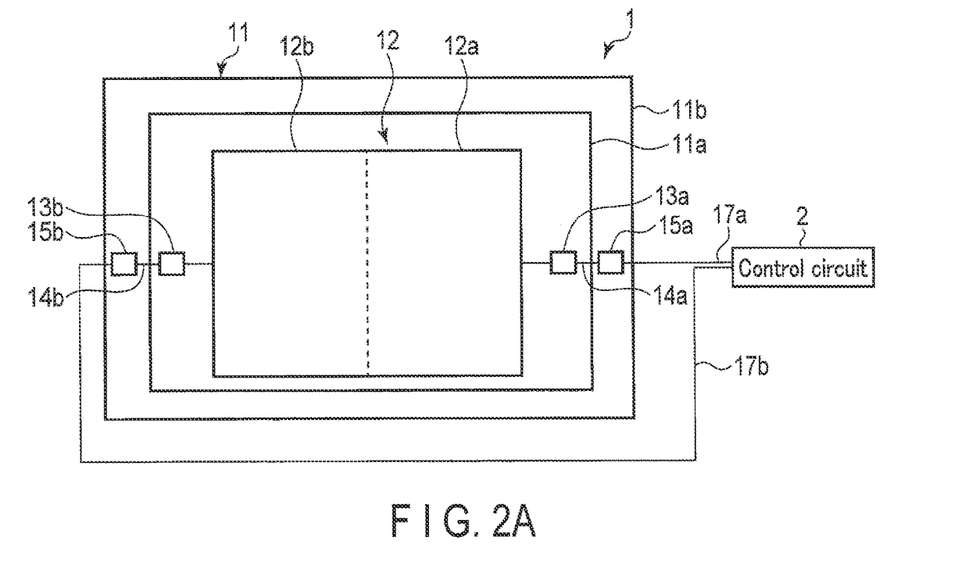
FIG. 2A is a frontal view of an exemplary structure of the capacitive sensor.
Figure 2B:
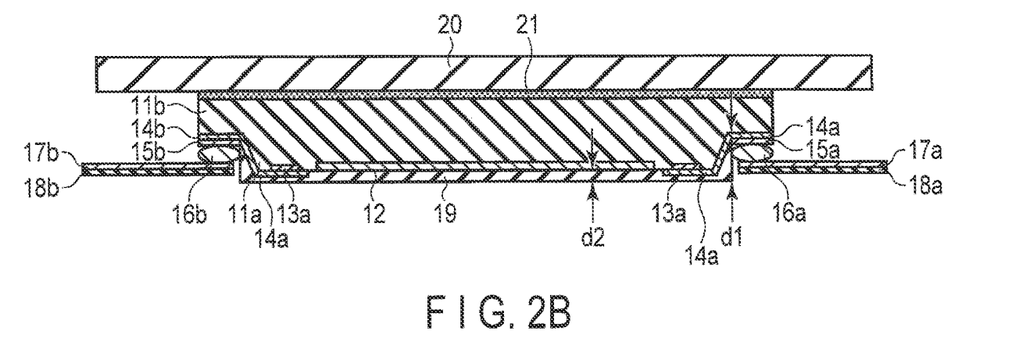
FIG. 2B is a cross section of an exemplary structure of the capacitive sensor.

FIG. 2A is a frontal view of an exemplary structure of the capacitive sensor 1, and FIG. 2B is a cross section of an exemplary structure of the capacitive sensor 1.

As illustrated in FIG. 2A, the capacitive sensor 1 includes a substrate 11, a sensing electrode 12, first electrode pads 13a and 13b, lines 14a and 14b, and second electrode pads 15a and 15b.

On the substrate 11 are various circuits of the capacitive sensor 1 mounted. The substrate 11 is, for example, a silicon substrate. According to the present embodiment, the substrate 11 includes a substrate surface portion 11a and a step portion 11b. The substrate surface portion 11a is a surface of the substrate 11 closest to the detection target 3 during its movement toward the detection target 3. On the substrate surface portion 11a are the sensing electrode 12 and first electrode pads 13a and 13b mounted. The step portion 11b is a portion of the substrate 11 containing a step. On the step portion 11b are the second electrode pads 15a and 15b formed. This means that, on account of the step portion 11b, the second electrode pads 15a and 15b are provided at a lower position in comparison with the sensing electrode 12 and first electrode pads 13a and 13b.

The sensing electrode 12 is configured to detect a capacitance. In particular, the sensing electrode 12 is configured to output a signal corresponding to the capacitance between the sensing electrode 12 and the detection target 3. For instance, if the detection target 3 is a circuit board, a detection signal is applied to the circuit board. Under this condition, when the sensing electrode 12 is brought in close proximity to the circuit board, which is a detection target 3, a capacitor is created between the sensing electrode 12 and detection target 3, and the sensing electrode 12 outputs a signal corresponding to the capacitance between the sensing electrode 12 and the detection target 3.

The sensing electrode 12 may be formed of a single sensing electrode, or by a plurality of linear or area sensing electrodes. For instance, FIG. 2A shows the sensing electrode 12 formed of two sensing electrodes 12a and 12b laterally separated at the broken-line border. The sensing electrodes 12a and 12b are arranged a certain distance apart, and respectively output a signal corresponding to the capacitance with respect to the facing detection target 3.

The first electrode pad 13a is arranged in the same layer as the sensing electrode 12, for example on the right side of the sensing electrode 12. The first electrode pad 13a is coupled to the right sensing electrode 12a, and also to the second electrode pad 15a by way of a line 14a. The first electrode pad 13b is arranged in the same layer as the sensing electrode 12, for example on the left side of the sensing electrode 12. The first electrode pad 13b is coupled to the left sensing electrode 12b, and also to the second electrode pad 15b by way of a line 14b.

First electrode pads are provided in equal number to sensing electrodes. For instance, when the sensing electrode 12 is formed of two sensing electrodes, the first electrode pad is formed of two first electrode pads 13a and 13b. Only one sensing electrode may be provided, and in this case only one first electrode pad is provided.

The line 14a couples the first electrode pad 13a to the second electrode pad 15a. The line 14b couples the first electrode pad 13b to the second electrode pad 15b. As illustrated in FIG. 2B, the line 14a is formed along the right-side wall of the step portion 11b. Similarly, as illustrated in FIG. 2B, the line 14b is formed along the left-side wall of the step portion 11b.

The second electrode pad 15a is provided on the right-side step portion 11b, and coupled to the first electrode pad 13a by way of the line 14a. As illustrated in FIG. 2B, a flexible print circuit board (FPC) 18a with an external line 17a attached is flip-chip bonded to the second electrode pad 15a with a bump 16a interposed. The second electrode pad 15b is provided on the left-side step portion 11b, and coupled to the first electrode pad 13b by way of the line 14b. As illustrated in FIG. 2B, a flexible print circuit board (FPC) 18b with an external line 17b attached is flip-chip bonded to the second electrode pad 15b with a bump 16b interposed. The external lines 17a and 17b are coupled to the control circuit 2.

As illustrated in FIG. 2B, a passivation layer 19 may be formed of polyimide (PI) and deposited as a protective film on the substrate surface portion 11a and step portion 11b of the substrate 11. The passivation layer 19 may be formed of a plurality of films. The passivation layer 19 serves as a protective film that protects the substrate surface portion 11a from being soiled, and from directly touching the detection target 3 even if the capacitive sensor 1 is accidentally brought into contact with the brought detection target 3. The passivation layer 19 protects the sensing electrode 12 and first electrode pads 13a and 13b provided on the substrate surface portion 11a. Furthermore, the substrate 11 may be adhered with an adhesive 21 to a print circuit board (PCB) 20, on which the control circuit and the like of the capacitive sensor 1 are mounted. Preferably, the passivation layer 19 is formed to be as thin as possible. The film thickness d2 of the passivation layer 19 may be 5 μm.

The capacitive sensor 1 is brought to and used in the proximity of a detection target, meaning that the total height of the components mounted on the step portion 11b will not exceed the height of the passivation layer 19. On the other hand, in order to increase the depth of the step portion 11b, high-level processing technique is required leading to increased costs. High-level processing technique is also required, however, to form the step portion 11b with a little depth. It is therefore preferable that a suitable depth of the step portion 11b be determined by balancing the processing difficulties.

Particularly when the FPC is flip-chip bonded, the depth of the step portion 11b is determined in consideration of the thickness of FPC 18a and 18b, the thickness of the bumps 16a and 16b, and the thickness of the second electrode pads 15a and 15b. For instance, when the thickness d2 of the passivation layer 19 is 5 μm, the depth d1 of the step portion 11b may be determined to be 100 μm in consideration of the level of processing difficulty and the thicknesses of the components.

Figure 3A:
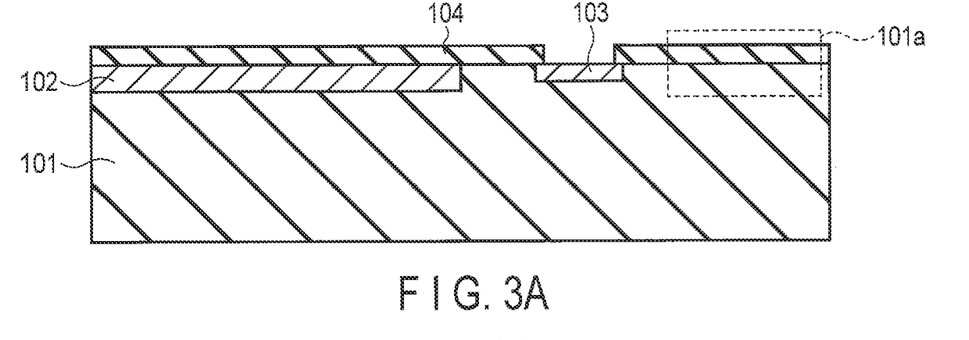
FIG. 3A is a process diagram explaining a step in a manufacturing method of the capacitive sensor.

Next, the manufacturing method of the capacitive sensor 1 according to the present embodiment will be explained. FIGS. 3A to 3N are process diagrams explaining the steps of the manufacturing method of the capacitive sensor 1.

The following manufacturing method begins with the state of a sensing electrode 102 and a first electrode pad 103 formed on a silicon substrate 101, which is the substrate 11, as illustrated in FIG. 3A. A passivation layer 104 is formed on the portion of the silicon substrate 101 except for the first electrode pad 103. The sensing electrode 102 and the first electrode pad 103 are formed in such a manner as to provide a step formation region 101a at the end of the silicon substrate 101 to form the step portion 11b.

FIGS. 3A to 3N show the manufacturing method of only the right-side portion of the substrate 11 in FIG. 2. The left-side portion of the substrate 11 in FIG. 2 can be formed in the same manufacturing method of the right-side portion explained below.

The preparation of the sensing electrode 102 and first electrode pad 103 on the silicon substrate 101 may adopt any method. The passivation layer 104 may be an oxide film or nitride film of any kind, which can be formed by chemical vapor deposition (CVD).

Figure 3B:
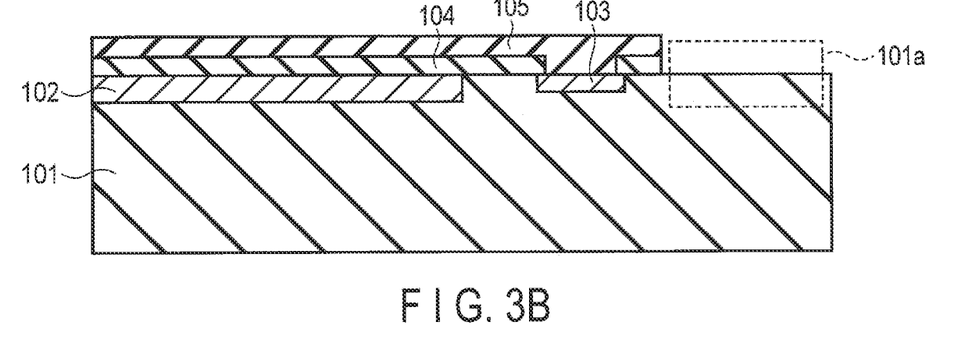
FIG. 3B is a process diagram explaining a step in the manufacturing method of the capacitive sensor.
Figure 3C:
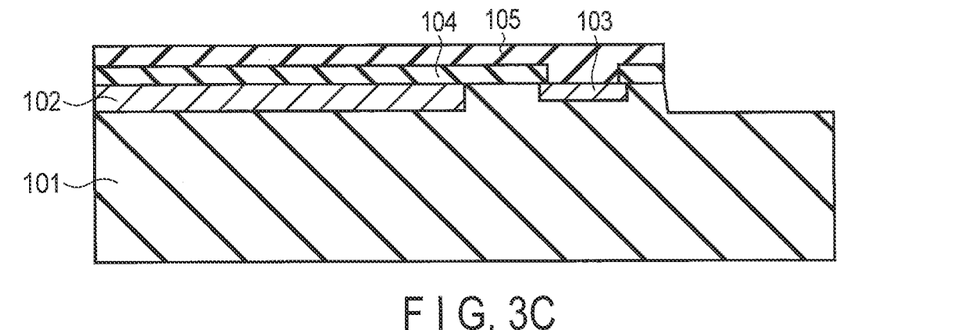
FIG. 3C is a process diagram explaining a step in the manufacturing method of the capacitive sensor.
Figure 3D:
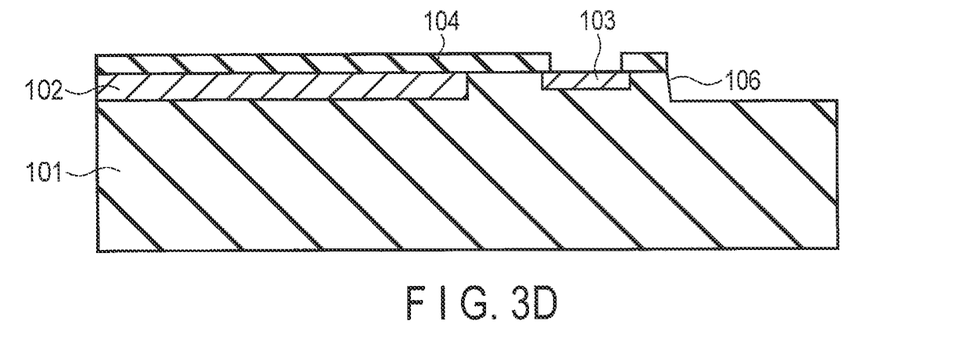
FIG. 3D is a process diagram explaining a step in the manufacturing method of the capacitive sensor.
Figure 3E:
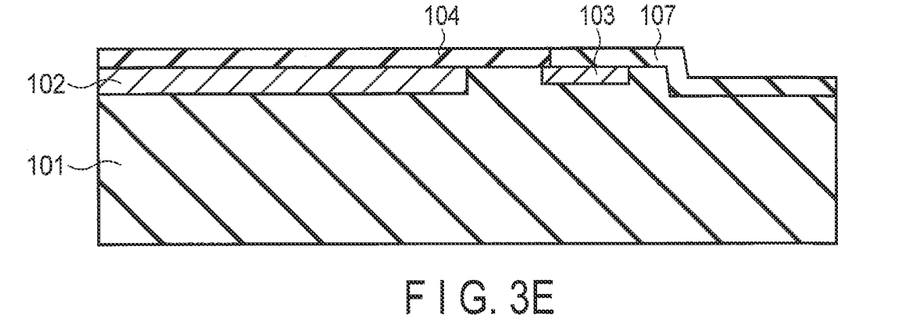
FIG. 3E is a process diagram explaining a step in the manufacturing method of the capacitive sensor.

First, as illustrated in FIG. 3B, etching is conducted on the passivation layer 104. For this etching, the silicon substrate 101 is coated with a photoresist 105 in such a manner as to have only the step formation region 101a exposed. Thereafter, as illustrated in FIG. 3C, the portion of the passivation layer 104 in the step formation region 101a of the silicon substrate 101 is etched off. Then, as illustrated in FIG. 3D, the photoresist 105 is removed. In this manner, a step portion 106, which will serve as the step portion 11b, is formed in the silicon substrate 101. Next, as illustrated in FIG. 3E, a passivation layer 107 is formed, for example through CVD, in the etched portion.

Figure 3F:
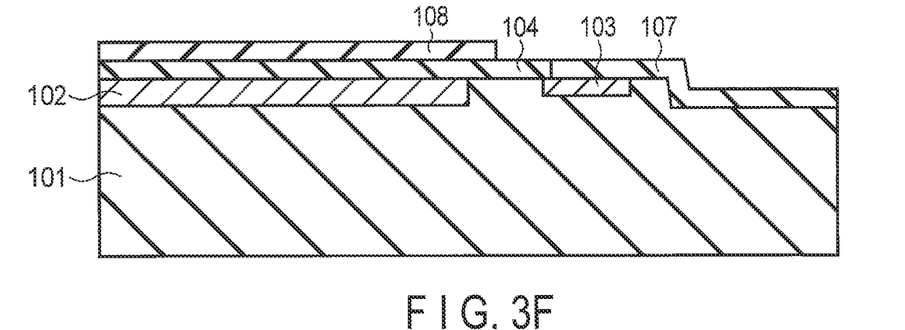
FIG. 3F is a process diagram explaining a step in the manufacturing method of the capacitive sensor.
Figure 3G:
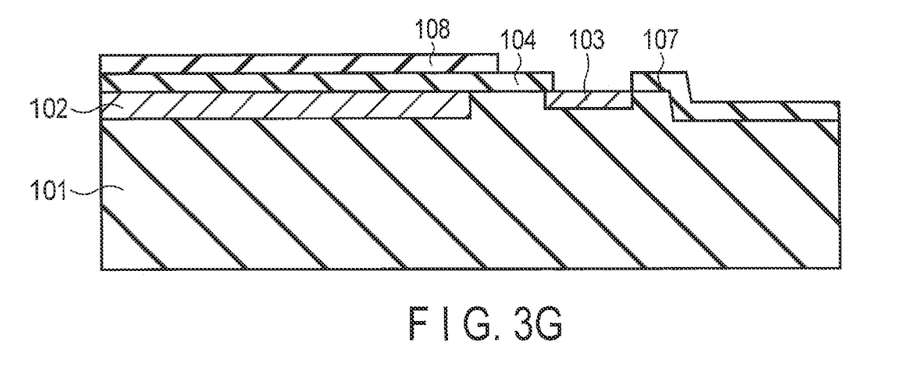
FIG. 3G is a process diagram explaining a step in the manufacturing method of the capacitive sensor.

As illustrated in FIG. 3F, a PI layer 108 is deposited on the sensing electrode 102 serving as a passivation layer. Thereafter, a portion of the passivation layer 107 above the first electrode pad 103 is etched off, as illustrated in FIG. 3G.

Figure 3H:
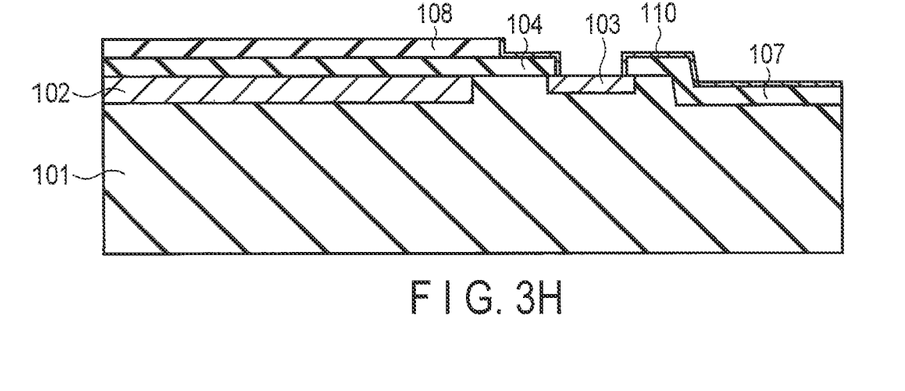
FIG. 3H is a process diagram explaining a step in the manufacturing method of the capacitive sensor.
Figure 3I:
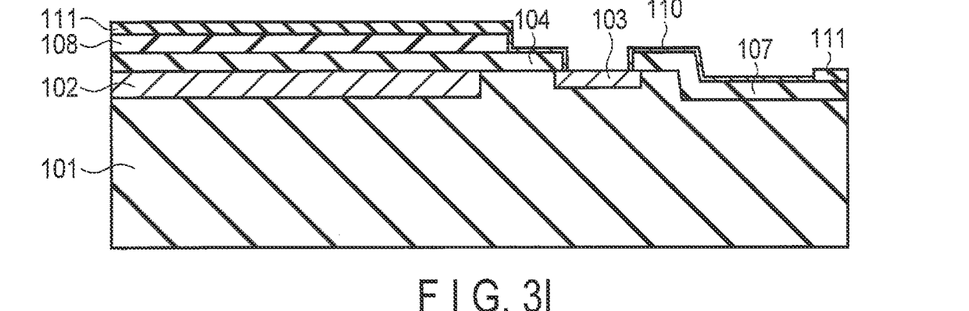
FIG. 3I is a process diagram explaining a step in the manufacturing method of the capacitive sensor.
Figure 3J:
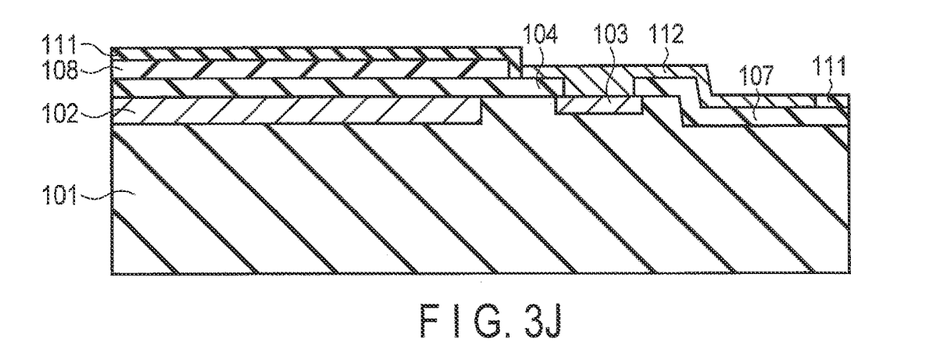
FIG. 3J is a process diagram explaining a step in the manufacturing method of the capacitive sensor.

As illustrated in FIG. 3H, a metal seed layer 110 is formed, for example through sputtering, on the insulative passivation layer 107 in order to prepare a metal line 14a. Thereafter, as illustrated in FIG. 3I, a photoresist 111 is applied in order to form a line 14a from the seed layer 110 in the vicinity of the first electrode pad 103. Then, through photolithography conducted upon the seed layer 110 in the vicinity of the first electrode pad 103, the seed layer 110 is processed into the shape of the line 14a. Thereafter, as illustrated in FIG. 3J, metal plating is conducted to form the line 14a. The line 112 in FIG. 3J will serve as the line 14a.

Figure 3K:
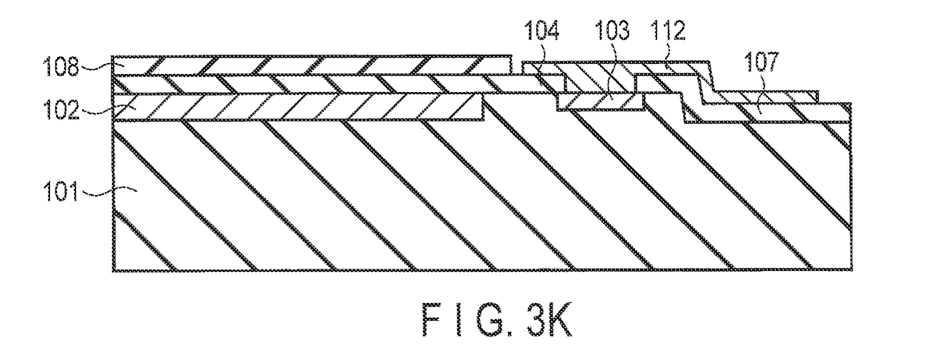
FIG. 3K is a process diagram explaining a step in the manufacturing method of the capacitive sensor.
Figure 3L:
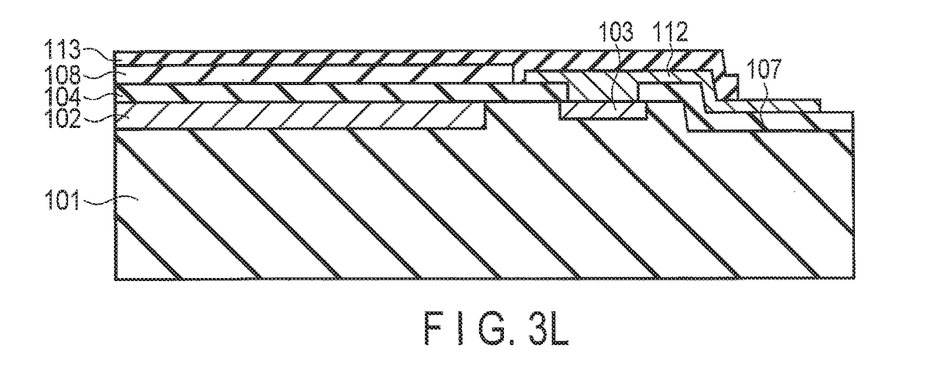
FIG. 3L is a process diagram explaining a step in the manufacturing method of the capacitive sensor.

Next, as illustrated in FIG. 3K, the photoresist 111 and seed layer 110 are removed. As illustrated in FIG. 3L, a PI layer 113, which will serve as a passivation layer, is stacked on the portion except for the step portion 106.

Figure 3M:
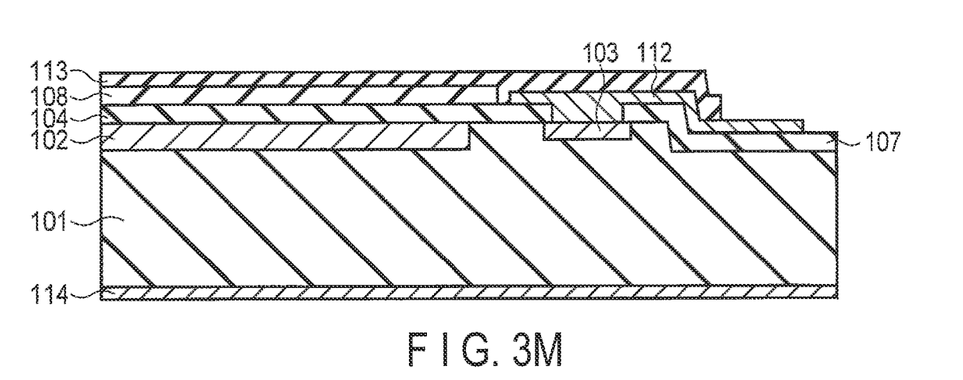
FIG. 3M is a process diagram explaining a step in the manufacturing method of the capacitive sensor.
Figure 3N:
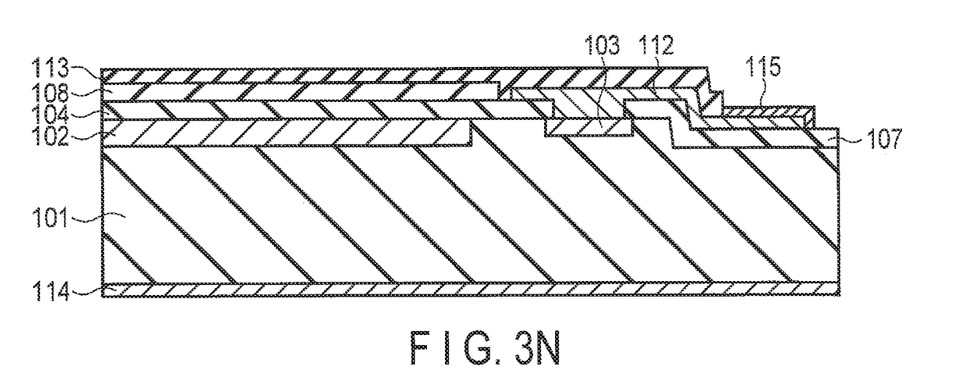
FIG. 3N is a process diagram explaining a step in the manufacturing method of the capacitive sensor.

As illustrated in FIG. 3M, a backside metal 114 is formed on the back side of the silicon substrate 101. Then, as illustrated in FIG. 3N, a second electrode pad 115 is formed, for example through flash plating, in the step portion 106. Flash plating is short-time thin plating.

As discussed above, in the capacitive sensor according to the present embodiment, the sensing electrode and the first electrode pad coupled to this sensing electrode are formed in the substrate surface portion, while the second electrode pad coupled to both the first electrode pad and the external line is formed in the step portion, which is lower than the substrate surface portion. This means that the line between the second electrode pad and external line can be provided at a position lower than the substrate surface portion. For this reason, the substrate surface portion of the capacitive sensor, namely, the sensing electrode, can be placed sufficiently close to a detection target. This increases the sensitivity of the capacitive sensor. In addition, even if the substrate surface portion of the capacitive sensor accidentally touches the detection target, the FPC or the like will not be in contact with the detection target. Thus, the FPC or the like will not be broken under the stress from the detection target.

The line between the first electrode pad and second electrode pad is formed along the wall of the step portion. This enhances the strength of the line between the first electrode pad and second electrode pad. As a result, the reliability of the capacitive sensor can also be enhanced.

Furthermore, the present embodiment requires only the formation of a step portion in the silicon substrate. Thus, processing such as through-silicon via (TSV) is not required. If TSV is to be conducted, a through electrode needs to be created inside the silicon substrate, and the silicon substrate is therefore preferably thinned. In contrast, the present embodiment does not require a silicon substrate to be thinned. A thick silicon substrate can be adopted so that the strength of the capacitive sensor can be ensured. This will improve the reliability in the case of accidental contact with a detection target. Furthermore, TSV comes with considerable costs, whereas the present embodiment can reduce manufacturing costs for a capacitive sensor, in which only a step portion is formed through etching or the like.

Modified Examples

Figure 4:
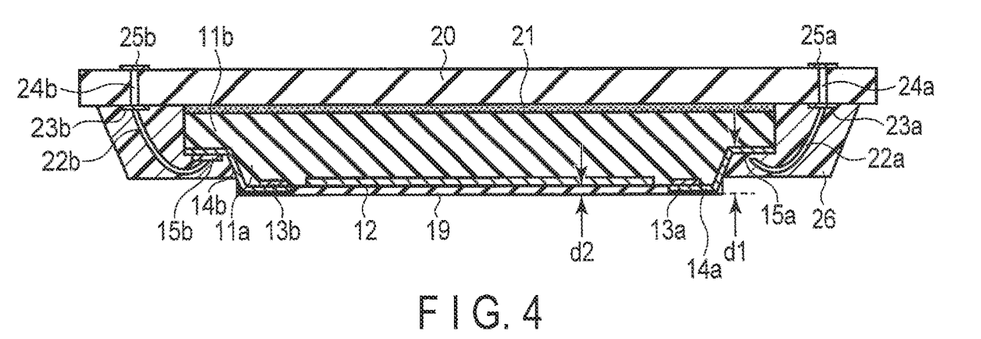
FIG. 4 is a cross section of an exemplary structure of a capacitive sensor according to a modification example.

Modification examples of the present embodiment will be explained. According to the embodiment, the FPC with an external line is flip-chip bonded onto the second electrode pad with a bump interposed. An external line, however, need not always be provided by flip-chip bonding. For instance, as illustrated in FIG. 4, the second electrode pads 15a and 15b may be coupled to the external electrodes 23a and 23b through wire bonding with wires 22a and 22b. In such an arrangement, the external electrodes 23a and 23b may be coupled to the external lines 25a and 25b on the back surface of the PCB 20 by way of the through holes 24a and 24b.

In the case of FIG. 4, each of the wires 22a and 22b includes a bent portion. In order to ensure the strength of the wires 22a and 22b, the vicinity of the wires 22a and 22b may be molded with a resin 26 or the like.

In the structure in which electrodes are mounted by wire bonding as in the modification example, the depth of the step portion 11b will be determined in consideration of both the height of the bent portions of the wires 22a and 22b, and of the thickness of the mold in addition to the aforementioned processing difficulty of the step portion 11b. With the currently available processing technique, it is difficult to design the height of the bent portions of the wires 22a and 22b to be less than 50 μm. If the depth d1 of the step portion 11b is 100 μm, the same as the aforementioned dimension, the total height of components on the step portion 11b will not exceed that of the passivation layer 19 even if the height of the bent portions is 50 μm.

The present invention is not limited to the above embodiments, and can be modified in various manners without departing from the gist of the invention at the stage of executing the invention. The embodiments may be suitably combined, which will produce combined effects. Furthermore, various inventions are included in the above embodiments, and various inventions can be extracted from any combination of selected ones of the disclosed structural components. For instance, even if some of the structural components are omitted in the embodiments, the structure from which these components are omitted may be extracted as an invention as long as the targeted issue can be solved and effects can be achieved.

What is claimed is:

1. A capacitive sensor comprising:
   a sensing electrode configured to output a signal corresponding to a capacitance between the sensing electrode and a detection target;
   a first electrode pad coupled to the sensing electrode;
   a first substrate having a substrate surface portion and a step portion, the sensing electrode and the first electrode pad being mounted on the substrate surface portion, and the step portion being formed at a position lower than the substrate surface portion; and
   a second electrode pad mounted on the step portion and coupled to an external line,
   wherein a second substrate, on which the external line is formed, is flip-chip bonded onto the second electrode pad, and
   a depth of the step portion is such that a sum of a thickness of the second substrate, a thickness of a bump that couples the second electrode pad and the second substrate, and a thickness of the second electrode pad does not exceed a height of the substrate surface portion.

2. The capacitive sensor according to claim 1, wherein a line coupling the first electrode pad to the second electrode pad is formed along the step portion.

3. A manufacturing method of a capacitive sensor, the method comprising:
   forming a step portion in a first substrate by etching an end region of the first substrate comprising a substrate surface portion on which a sensing electrode and a first electrode pad are mounted, wherein the sensing electrode is configured to output a signal corresponding to a capacitance between the sensing electrode and a detection target, and the first electrode pad is coupled to the sensing electrode;

forming a line extending from the first electrode pad to the step portion;

forming, in the step portion, a second electrode pad coupled to the line and an external line; and flip-chip bonding, onto the second electrode pad, a second substrate on which the external line is formed, wherein, in forming the step portion, a depth of the step portion is determined such that a sum of a thickness of the second substrate, a thickness of a bump that couples the second electrode pad and the second substrate, and a thickness of the second electrode pad does not exceed a height of the substrate surface portion.

* * * * *